March 28, 1950
C. G. SMITH
2,502,394
RADIO BEACON SYSTEM
Filed Aug. 9, 1945
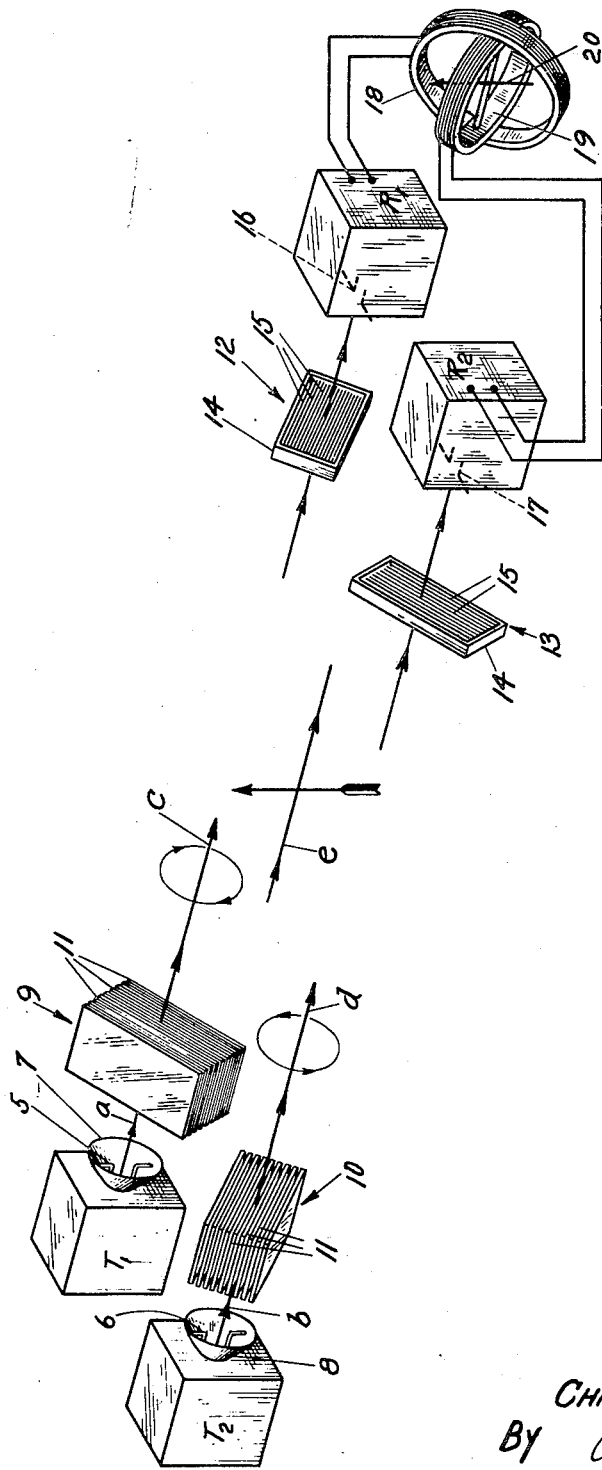
INVENTOR.
CHARLES G. SMITH,
By Elmer J. Gorn
ATTY.

UNITED STATES PATENT OFFICE 2,502,394

RADIO BEACON SYSTEM

Charles G. Smith, Medford, Mass., assignor to Raytheon Manufacturing Company, Newton, Mass., a corporation of Delaware Application August 9, 1945, Serial No. 609,788

6 Claims. (Cl. 343—101)

My present invention relates to radio beacon systems for guiding aircraft or the like along a prescribed course.

Existing systems of the general character indicated are relatively complex, and require one form or another of modulation to be impressed upon one or more carriers.

It is an object of my present invention to provide a simplified radio beacon system in which the necessity of any form of modulation is eliminated.

It is a further object of my present invention to accomplish the foregoing by utilizing the state of polarization of a radio beam at a given location in space to determine the position of said location with respect to the aforementioned prescribed course.

These and other objects of my present invention, which will become apparent as the detailed description thereof progresses, are attained, briefly, in the following manner:

I provide means for radiating into space a pair of polyphased radio waves whose electric vectors rotate in opposite sense with respect to each other. I use the term "polyphased" to designate that the electric vector of the wave rotates at a point in space substantially at the frequency of said wave, whether or not the absolute magnitude of said vector remains constant during such rotation. The term, therefore, is to be construed generically, so as to include both circularly-polarized and elliptically-polarized waves; for, by the term "circularly-polarized," I mean to designate a wave whose electric vector rotates at a point in space at the frequency of said wave, and is essentially constant in absolute magnitude during a single rotation; and by the term "elliptically-polarized," I mean to designate a wave whose electric vector rotates at a point in space at the frequency of said wave, but is cyclically varying in absolute magnitude at said frequency. Such waves are to be distinguished from "plane-polarized waves," by which term I mean to designate a wave whose electric vector at a point in space lies in a predetermined, fixed plane.

The above-mentioned polyphased waves are produced at transmitting stations located some distance apart, their radiation, preferably, being directional, along parallel lines. In the median spatial region between the axes of said waves, which region constitutes the above referred to prescribed course, said waves combine to form a plane-polarized wave whose electric vector lies in a predetermined, fixed plane, for example, a vertical plane. However, on either side of said median spatial region, the distances between any selected point in space and the aforementioned transmitting stations are unequal, so that, at said selected point, there exists a phase difference between said waves. Such a phase difference rotates the plane of polarization of the wave resulting from the combination of the two original waves, the direction of such rotation depending upon the direction of the deviation from the median spatial region. Hence, by employing suitable receiving and indicating devices, the direction of said deviation may be ascertained, thereby enabling the observer to return to the prescribed course.

It will be noted that the system above described is much simpler than existing systems for similar purposes, and requires no modulation.

In the accompanying specification I shall describe, and in the annexed drawings show, an illustrative embodiment of the radio beacon system of my present invention. It is, however, to be clearly understood that I do not wish to be limited to the details herein shown and described for purposes of illustration only, inasmuch as changes therein may be made without the exercise of invention and within the true spirit and scope of the claims hereto appended.

In said drawing, the single figure is a schematic view of a radio beacon system assembled in accordance with the principles of my present invention.

Referring now more in detail to the aforesaid illustrative embodiment of my present invention, and with particular reference to the drawing illustrating the same, the reference characters $T_1$ and $T_2$ generally designate radio transmitters, located on the ground, some distance apart, and provided, respectively, with suitable radiating elements 5 and 6, disposed within parabolic reflectors 7 and 8 or any other means for obtaining the desired directional characteristics of the transmission. Preferably, said transmitters operate at the same frequency, and the radiating elements are vertically disposed, so that the resulting parallel, directional beams are plane-polarized in a vertical plane.

Disposed in the paths of said beams are, what may be called, "orthophase structures" 9 and 10, said structures being intended to transform said plane-polarized waves into polyphased waves, preferably, circularly-polarized waves. Such structures are disclosed in my co-pending application entitled "Method and Means for Controlling the Polarization of Radiant Energy," Serial No. 446,847, filed June 12, 1942, now Patent No. 2,464,269, dated March 15, 1949.

As indicated in said co-pending application, a polyphased wave may be considered as resulting from the combination of two out-of-phase components of equal amplitude disposed in space quadrature. Although in producing polyphased waves, two plane-polarized waves may be used to provide the two equal-amplitude components, it may be difficult to match the waves to make them equal and of proper phase relationship.

Therefore, I prefer that a wave radiated from a single source be used to provide both components of each of the polyphased waves above referred to. The method of separating a single, plane-polarized wave into two equal-amplitude components in space quadrature, and differing in phase by any desired amount, will next be considered.

Assume a plane-parallel slab of material which is homogeneous, but not isotropic, in that it presents unequal dielectric constants along its X and Y axes to a radio wave passing therethrough normal to the planes of the faces thereof. Assume further that the dielectric constant along the X axis is the smaller of the two, and that the plane of polarization of the wave passing through said slab is at an angle of 45° to said X axis. Such a wave may be considered to have two components, one along the X axis, and the other along the Y axis. Now, the velocity of a radio wave, or of any of its components, is dependent upon the dielectric constant of the medium through which it is propagated, and the greater the dielectric constant, the less the velocity of the wave, or of any component thereof, affected thereby. It will thus be seen that the component along the X axis will lead the component along the Y axis, so that the two equal-amplitude components emerging from the theoretical slab under consideration will be in space quadrature, and will differ in phase by an amount dependent upon the depth of said theoretical slab. The resultant wave is, therefore, polyphased.

Returning now to the orthophase structures 9 and 10 above referred to, they may, each, comprise a plurality of glass plates 11 arranged parallel to each other, and separated small distances apart. These plates may be held in position by any preferred end members (not shown). The X axis will be assumed to be that axis which lies in the plane which is perpendicular to the planes of the plates 11, the Y axis, therefore, being that axis which lies in the plane which is parallel to the planes of the plates. The arrows on the lines $a$ and $b$ indicate the direction of propagation of the waves radiated, respectively, by the transmitter $T_1$ and $T_2$.

The dielectric constant of each of the orthophase structures, along the assumed X axis, is less than that along the assumed Y axis, as will be clear from the following: The dielectric constant of air is 1, while the dielectric constant of glass is approximately 8. The components of each wave which lies along the X axis are transverse of the length of the glass plates 11, and, therefore, are affected only by the thickness of such plates; but, the components which lies along the Y axis are affected by the entire length of the plates. Thus, more glass is presented to the components along the Y axis than is presented to the components along the X axis, and so, the dielectric constant along the X axis is less than that along the Y axis. It becomes apparent that the components along the Y axis will travel more slowly than those along the X axis, and by properly selecting the depth of the structure, the two components emerging therefrom can be made to have any desired phase relationship. I prefer that the resultant wave be circularly-polarized, and, therefore, said depth should be such as to result in a 90° phase difference.

In order to cause the resultant waves $c$ and $d$ amanation, respectively, from the orthophase structures 9 and 10 to have their electric vectors rotate in opposite sense with respect to each other, I dispose said structures, oppositely, at 45° with respect to the vertical.

Now, the waves $c$ and $d$ spread, and combine in the median spatial region therebetween. The result of this combination, within said median spatial region, which, as earlier indicated, constitutes the prescribed course, is a plane-polarized wave $e$ whose electric vector lies in a vertical plane. Of course, by altering the phase relationship between the polyphase waves $c$ and $d$, the plane of polarization of the resultant wave $e$ can be altered to lie in any other predetermined, fixed plane. Outside of the median spatial region, the difference in the distances between any selected point and the two transmitters $T_1$ and $T_2$ introduces a phase difference between the two originally radiated waves, and this phase difference rotates the plane of polarization of the resultant wave to a plane different from that within said median spatial region. If the selected point is to the right of the median spatial region, assuming that the observer is facing the transmitters, the polyphased wave $c$ will lead the polyphased wave $d$, and the polarization plane of the resultant wave will rotate to the right. If the selected point is to the left, opposite conditions attain. Furthermore, the magnitude of the rotation in each direction is a function of the extent of the deviation from the median spatial region.

While not limited thereto, I may utilize the above phenomena in the following manner: If a grid of spaced parallel wires is interposed in the path of a plane-polarized wave, with the plane of the wires parallel to the polarization plane of the wave, very little of the wave energy will pass through the grid. Most of it will be reflected. On the other hand, if the grid is disposed perpendicularly to the polarization plane of the oncoming wave, most of the energy will pass therethrough. Hence, by interposing two grid structures 12 and 13, each comprising a rectangular frame 14 supporting a multiplicity of spaced parallel wires 15, in the path of the plane-polarized wave resulting from the combination of the polyphased waves $c$ and $d$, and oppositely disposing said structures, 45 degrees with respect to the vertical, equal amounts of energy will pass through said structures. To the rear of the structures 12 and 13, I provide two receivers $R_1$ and $R_2$, equipped, respectively, with antennae 16 and 17, in the case under consideration, horizontally-polarized.

The output of the receiver $R_2$ may be applied to a coil 18, and the output of the receiver $R_2$ may be applied to a coil 19, said coils being disposed at right angles to each other, and at 45 degrees to the vertical. An indicating needle 20, made of magnetic material, may be suitably suspended in the coil assembly just described, so that when the craft carrying the receiving equipment is "on course," and equal-intensity signals are, therefore, being applied to the coils 18 and 19, the needle 20 will remain vertically disposed.

If, however, the craft is at a point "off course," to the right of the median spatial region, so that, at that point, the polarization plane of the received wave is rotated to the right, a stronger signal will pass through the grid 12 than through the grid 13 to apply the greater current to the coil 18, thereby swinging the needle 20 to the right. It follows that the needle will swing to the left if the craft is at a point "off course," to the left of the prescribed course corresponding to the median spatial region.

This completes the description of the aforesaid illustrative embodiment of my present invention. It will be noted from all of the foregoing that I have provided a simple radio beacon system which requires no modulation, and which utilizes the state of polarization of the transmitted energy to actuate the receiving equipment and indicate the direction of the deviation from the prescribed course.

Other objects and advantages of my present invention will readily occur to those skilled in the art to which the same relates.

What is claimed is:

1. In a radio beacon system: means for transmitting a pair of polyphased radio waves whose electric vectors rotate in opposite sense with respect to each other; said radio waves having relative frequencies and being in relative time-phase to produce, within the median spatial region therebetween, a resultant wave having a predetermined polarization characteristic, and without said median spatial region, resultant waves having different polarization characteristics which vary with the direction of the deviation from said median spatial region; and means for receiving said radio waves and indicating the instantaneous polarization characteristic thereof.

2. In a radio beacon system: means for producing a pair of similarly plane-polarized radio waves; and means for transforming said plane-polarized waves into polyphased radio waves whose electric vectors rotate in opposite sense with respect to each other; said radio waves having relative frequencies and being in relative time-phase to produce, within the median spatial region therebetween, a resultant wave having a predetermined polarization characteristic, and without said median spatial region, resultant waves having different polarization characteristics which vary with the direction of the deviation from said median spatial region; and means for receiving said radio waves and indicating the instantaneous polarization characteristic thereof.

3. In a radio beacon system: means for transmitting a pair of polyphased radio waves whose electric vectors rotate in opposite sense with respect to each other; said radio waves having relative frequencies and being in relative time-phase to produce, within the median spatial region therebetween, a resultant plane-polarized wave whose electric vector lies in a predetermined plane, and without said median spatial region, resultant plane-polarized waves whose electric vectors lies in different planes which vary with the direction of the deviation from said median spatial region; and means for receiving said radio waves and indicating the instantaneous plane of polarization thereof.

4. In a radio beacon system: means for producing a pair of similarly plane-polarized radio waves; and means for transforming said plane-polarized waves into polyphased radio waves whose electric vectors rotate in opposite sense with respect to each other; said radio waves having relative frequencies and being in relative time-phase to produce, within the median spatial region therebetween, a resultant plane-polarized wave whose electric vector lies in a predetermined plane, and without said median spatial region, resultant plane-polarized waves whose electric vectors lie in different planes which vary with the direction of the deviation from said median spatial region; and means for receiving said radio waves and indicating the instantaneous plane of polarization thereof.

5. In a radio beacon system: means for transmitting a pair of circularly-polarized radio waves whose electric vectors rotate in opposite sense with respect to each other; said radio waves having relative frequencies and being in relative time-phase to produce, within the median spatial region therebetween, a resultant plane-polarized wave whose electric vector lies in a predetermined plane, and without said median spatial region, resultant plane-polarized waves whose electric vectors lie in different planes which vary with the direction of the deviation from said median spatial region; and means for receiving said radio waves and indicating the instantaneous plane of polarization thereof.

6. In a radio beacon system: means for producing a pair of similarly plane-polarized radio waves; and means for transforming said plane-polarized waves into circularly-polarized radio waves whose electric vectors rotate in opposite sense with respect to each other; said radio waves having relative frequencies and being in relative time-phase to produce, within the median spatial region therebetween, a resultant plane-polarized wave whose electric vector lies in a predetermined plane, and without said median spatial region, resultant plane-polarized waves whose electric vectors lie in different planes which vary with the direction of the deviation from said median spatial region; and means for receiving said radio waves and indicating the instantaneous plane of polarization thereof.

CHARLES G. SMITH.

REFERENCES CITED

The following references are of record in the file of this patent:

UNITED STATES PATENTS

| Number | Name | Date |
| --- | --- | --- |
| 1,841,654 | Korschenewsky | Jan. 19, 1932 |
| 1,915,784 | Hammond, Jr. | June 27, 1933 |
| 1,934,924 | Heintz | Nov. 14, 1933 |
| 1,958,886 | Chubb | May 15, 1934 |
| 1,974,545 | Saito | Sept. 25, 1934 |
| 2,176,469 | Moueix | Oct. 17, 1939 |
| 2,218,907 | Donnelley et al. | Oct. 22, 1940 |
| 2,283,054 | Gossel | May 12, 1942 |
| 2,288,196 | Kramar | June 30, 1942 |